US009510559B2

(12) United States Patent
Oshima et al.

(10) Patent No.: US 9,510,559 B2
(45) Date of Patent: Dec. 6, 2016

(54) CAGE FOR BREEDING SMALL ANIMALS

(71) Applicant: Eatron, Inc., Osaka (JP)

(72) Inventors: Shigeru Oshima, Osaka (JP); Yoshiko Oshima, Osaka (JP); Satoru Maki, Osaka (JP)

(73) Assignee: EATRON, INC., Osaka (JP)

( * ) Notice: Subject to any disclaimer, the term of this patent is extended or adjusted under 35 U.S.C. 154(b) by 226 days.

(21) Appl. No.: 14/278,115

(22) Filed: May 15, 2014

(65) Prior Publication Data

US 2014/0245966 A1 Sep. 4, 2014

Related U.S. Application Data

(63) Continuation-in-part of application No. PCT/JP2012/002441, filed on Apr. 6, 2012.

(30) Foreign Application Priority Data

Nov. 16, 2011 (JP) .................................. 2011-250776

(51) Int. Cl.
*A01K 1/02* (2006.01)
*A01K 1/03* (2006.01)
*A01K 7/00* (2006.01)

(52) U.S. Cl.
CPC .................. *A01K 1/03* (2013.01); *A01K 1/031* (2013.01); *A01K 7/00* (2013.01)

(58) Field of Classification Search
CPC ......... A01K 1/03; A01K 1/031; A01K 1/0356
USPC ................ 119/472, 402, 408, 409, 412, 453, 454,119/475, 477, 521
See application file for complete search history.

(56) References Cited

U.S. PATENT DOCUMENTS

| 311,719 | A | * | 2/1885 | Burton | .................. | B61D 3/163 |
| | | | | | | 119/412 |
| 2,346,001 | A | * | 4/1944 | Bate | ......................... | A01K 1/03 |
| | | | | | | 119/472 |
| 2,988,044 | A | * | 6/1961 | Adelberg | ............... | A01K 1/031 |
| | | | | | | 119/417 |

(Continued)

FOREIGN PATENT DOCUMENTS

| JP | 412541 | 2/1966 |
| JP | 4843024 | 12/1973 |

(Continued)

OTHER PUBLICATIONS

International Search Report and Written Opinion dated Jul. 18, 2012 in Application No. PCT/JP2012/002441.

*Primary Examiner* — Kristen C Hayes
(74) *Attorney, Agent, or Firm* — Snell & Wilmer L.L.P.

(57) ABSTRACT

The cage for breeding small animals according to the present invention comprises a casing with an opening on an upper surface thereof, and a lid for covering the opening of the casing. The lid comprises a frame body attached to an upper end edge of the casing, and an opening for a water supply apparatus to which the water supply apparatus is attached in an openable and closable fashion. A partition board is placed in the casing to divide the housing section within the casing into two. A ventilation section is provided in the partition board, for ventilation between one room and the other room of the divided housing section in the casing. A communicating section for placing a tip of a nozzle of the water supply apparatus is provided by cutting out the partition board.

15 Claims, 15 Drawing Sheets

(56) References Cited

U.S. PATENT DOCUMENTS

| | | | | |
|---|---|---|---|---|
| 3,256,859 | A | * | 6/1966 | Petit, Jr. ............... A01K 1/0356 119/475 |
| 3,537,428 | A | * | 11/1970 | Montgomery ......... A01K 1/031 119/419 |
| 3,572,293 | A | * | 3/1971 | Schroen ............... A01K 1/0356 119/475 |
| 4,480,587 | A | * | 11/1984 | Sedlacek ............... A01K 1/031 119/419 |
| D351,259 | S | * | 10/1994 | Semenuk ..................... D30/119 |
| 7,380,435 | B1 | * | 6/2008 | Henderson ............. A01K 1/031 119/712 |
| 8,037,847 | B2 | * | 10/2011 | Malnati ................. A01K 1/031 119/418 |
| 8,689,739 | B2 | * | 4/2014 | Owens .................... A01K 1/03 119/417 |
| 2006/0254528 | A1 | * | 11/2006 | Malnati ................. A01K 1/031 119/419 |
| 2011/0061600 | A1 | | 3/2011 | Conger et al. |
| 2014/0238309 | A1 | * | 8/2014 | Hahn ...................... A01K 1/03 119/472 |

FOREIGN PATENT DOCUMENTS

| | | |
|---|---|---|
| JP | 2011200154 | 10/2011 |
| WO | 03096801 | 11/2003 |

\* cited by examiner (a)

(b)

(a)

(b)

(a)

(b)

CAGE FOR BREEDING SMALL ANIMALS

CROSS-REFERENCE TO RELATED APPLICATIONS

This application is continuation in part of PCT/JP2012/002441 filed on Apr. 6, 2012, which claims priority from Japanese Application No. 2011-250776 filed on Nov. 16, 2011, both of which are incorporated herein by reference.

TECHNICAL FIELD

The present invention relates to a cage for breeding small animals on the basis of novel and revolutionary ideas. Specifically, the present invention relates to a closed-system cage for breeding small animals, used for breeding small animals such as rats, mice, and guinea pigs in isolation, such that in a case of providing genetically-modified small animals for a biological experiment or the like, the cage is capable of allowing for the quality of such small animals to be confirmed or guaranteed, such that the animal is not infected with any pathogenic bacteria or the like, and if the animal is infected with such pathogenic bacteria, the presence of the pathogenic bacteria is detected. More specifically, the present invention relates to a closed-system cage for breeding small animals, capable of: allowing for the quality of small animals, which are to be a subject of a biological experiment or research, to be appropriately ascertained; allowing for the monitoring of individual small animals without contaminating other small animals within the facility, at a low cost, with ease and in safety; and allowing for the breeding environment to be cleaned at a low cost and with ease.

BACKGROUND ART

In the bioscience fields with intensifying researches, millions of experimental small animals (e.g., mice, rats and the like; hereinafter referred to as small animals) such as conventional animals, SPF animals, gnotobiotic animals and germfree animals are subject to research, experimentation, inspection, and the like every year. As the modification of genes is facilitated regardless of the size of facilities, hundreds of thousands of small animals are produced at hundreds of research institutions in the nation throughout the year. Furthermore, delivery and receipt of those small animals are performed frequently and broadly between such research institutions, and the small animals are used for research and experimental purposes.

Under existing circumstances, however, breeding and reproducing of small animals are conducted at various places from a breeding and experimenting facility in a clean environment with highly controlled air conditioning (hereinafter, referred to as a facility) to an ordinary small room or the like with no control of air conditioning. Thus, there occur variations in the microbiological quality of such small animals, which have great and negative influences on research and experiments and which also causes problems regarding qualification of small animals that may be used as a subject of research or experimentation.

For example, if small animals contaminated with pathogenic microbes are brought to a facility, the entire facility will be a new source of contamination, and for cleaning the facility, it will cost several hundred million yen and take labor to dispose of all the small animals and to disinfect and improve the facility. Furthermore, a time loss of between three months and nearly a year is required for the cleaning of the facility environment and causes a very great deal of lost progress to research.

In order to avoid such circumstances, a quarantine inspection (mainly visual inspection on the conditions of the animals, and the like) or preparation and attachment of a monitoring report or the like (hereinafter, referred to as a certificate) are conducted upon delivery and receipt of those small animals. However, this certificate merely indicate under what conditions such small animals being delivered were bred, and never guarantees the microbiological quality of the individual small animals.

Thus, what is initially important is to confirm that animals with a specific quality and being subject to a specific biological experiment (referred to as a subject animal), such as mice with specific genetical modification, animals bred in a germfree condition regardless of their genes, or animals infected with specific bacteria, are not infected with any disease, or the animals are not infected with some kind of microorganism. The cage according to the present invention is used for such a confirmation.

The subject animals are bred in various different environments and brought into research institutions as animals with a specific quality; however, it is not certain whether that would be true.

Of course, even if the subject animals are confirmed as being infected, there is a possibility that such infected animals will not influence the ultimate purpose of the subject animals, i.e., biological experiments. However, confirmation experiments using a cage have meaning in a sense that the fact of the subject animals being infected with some microorganism remains as data for this cage.

Furthermore, in a case where an intended biological experiment is genetic modification or the like when the subject animals are genetically-modified animals, even if the subject animals are infected with some kind of microorganisms, or they are infected with some disease, it is often that there is no influence from the genetic point of view to the experiment. Thus, researchers proceed with the intended experiment with no concern about the microorganic infection or disease. As a result, a problem of infection to other subject animals will occur, which may reduce the accuracy of biological experiments with the other subject animals.

However, the use of the cage according to the present invention allows the presence of infectious microorganisms or diseases to be detected, thereby inhibiting their influence of other subject animals. As a result, it becomes possible to increase the accuracy of biological experiments on the other subject animals.

Although there is no prior art to the present invention, which solves the problem as described above, prior art that is thought to be related even a little will be described below.

Japanese Laid-Open Publication No. 9-252676 (Patent Literature 1) discloses an experimental animal breeding apparatus configured such that a plurality of animal breeding cages are arranged in a breeding rack (hereinafter, referred to as a rack) and only the air that has passed through animals (which corresponds to the subject animals in the present invention) housed in the cages flows into a monitoring room in order to conduct microbiological monitoring (hereinafter, referred to as monitoring).

According to this apparatus, animals in the monitoring room breathe in the air that has had a contact with a plurality of animals in the cages. If there is an animal that is infected with microorganisms in the rack, the animals in the monitoring room will certainly be infected with the microorganisms. Thus, observation and inspection of the animals in the monitoring room allows an infection state of the animals in the rack to be confirmed promptly, and allows means of preventing the increase of infected animals to be immediately applied.

While this apparatus can detect pathogenic microorganisms of the infected animals in the monitoring room, it is not possible, however, to specify which animal is the source of infection because the animals have been infected through air that has passed through all the small animals in a plurality of racks. Furthermore, it is feared small animals in other adjacent cases will also be infected. Thus, it is necessary to take a large-scale measure for not only the small animals in the rack, but also all the other small animals in the entire facility for disposal, disinfection or the like.

Japanese Laid-Open Publication No. 2011-200154 (Patent Literature 2) and Housha-sen Kagaku, National Institute of Radiological Sciences, August 2007, Vol. 50, No. 8, pages 11 to 13 (Non-Patent Literature 1) discloses a sectioned animal cage used for testing of infection and the like among animals. This cage has a casing with an upper surface that can be opened, a dividing member made of a wire net arranged within the casing, and a lid that can be opened and closed and that is arranged at an opening part of each of two living spaces divided by the dividing member in the casing. Each lid is provided with a water tank and a feeding box.

However, when conditions of infection are monitored among small animals (which corresponds to the subject animals in the present invention) using the cage, there is a possibility of the infection being spread through the lid to the rack as well as the entire facility because the lid is made of a wire net to form a vent.

CITATION LIST

Patent Literature patcit 1: Japanese Laid-Open Publication No. 9-252676
patcit 2: Japanese Laid-Open Publication No. 2011-200154

Non-Patent Literature nplcit 1: Housha-sen Kagaku, National Institute of Radiological Sciences, August 2007, Vol. 50, No. 8, pages 11 to 13

SUMMARY OF INVENTION

Technical Problem

The present invention is intended to solve the defects described above. It is an objective of the present invention to provide a cage for breeding small animals, capable of: allowing for the quality of small animals, which are to be a subject of an experiment, to be appropriately ascertained; allowing for individual small animals to be monitored at a low cost, with ease, and in safety; and allowing for economical and human inputs as well as temporal loss required for cleaning the breeding environment to be kept to a minimum.

It is another objective of the present invention to provide a cage for breeding small animals, capable of allowing for individual small animals to be monitored without allowing pathogenic bacteria of small animals in a cage to contaminate other small animals in another cage or to contaminate the facility.

It is still another objective of the present invention to provide a cage for breeding small animals, capable of allowing for a source of infection of small animals to be detected accurately.

Solution to Problem

The cage for breeding small animals according to the present invention are characterized as follows:

A closed-system cage for breeding small animals, comprising: a casing with an opening on an upper surface thereof; a lid for covering the opening of the casing; and a water supply apparatus attached in an openable and closable fashion to an opening for the water supply apparatus, provided with the lid, wherein: a partition board is placed to divide a housing section within the casing into a left room and a right room; a ventilation section for ventilation between one room and the other room of the divided housing section of the casing is provided in the partition board; and a communicating section for placing a tip of a nozzle provided with the water supply apparatus is provided at the partition board.

The cage for breeding small animals according to the present invention, wherein: an air pipe for sending air into the casing is provided on the lid, and an exhaust pipe for exhausting the air in the casing is provided on the lid; and the air pipe is facing the one room of the housing section in the casing, and the exhaust pipe is facing the other room of the housing section.

The cage for breeding small animals according to the present invention, wherein: the partition board comprises the ventilation section, and a shielding section for shielding the border between the one room and the other room of the housing section in the casing, and the ratio of the area of the ventilation section to the partition board is 10 to 50%.

The cage for breeding small animals according to the present invention, wherein: the ventilation section is formed of a mesh material attached to the opening provided in the partition board, or to a passage hole or slit provided in the partition board.

The cage for breeding small animals according to the present invention, wherein the communicating section is formed by cutting out an upper end edge of the partition board.

The cage for breeding small animals according to the present invention, wherein the communicating section is a passage hole provided in the partition board.

The cage for breeding small animals according to the present invention, wherein a guiding member for guiding a tip of the nozzle is attached to the communicating section.

The cage for breeding small animals according to the present invention, wherein the guiding member is a cylindrical body, and the tip of the nozzle is insertable into the cylindrical body.

The cage for breeding small animals according to the present invention, wherein a seal member is placed between the casing and the lid, and a seal member is placed in between a periphery of the opening for a water supply apparatus formed in the lid and the water supply apparatus.

The cage for breeding small animals according to the present invention, wherein: the casing comprises an outer case and an inner case; an engaging protrusion for retaining the partition board is provided at a bottom portion of the inner case; an engaging recess section, which can engage with the engaging protrusion, is provided at a bottom portion of the partition board; and a protrusion, which can engage with a recess portion provided on a bottom surface side of the engaging protrusion of the inner case, is provided at a bottom portion of the outer case.

The cage for breeding small animals according to the present invention, wherein a gripping member facing a part of the opening for a water supply apparatus is attached to a lower surface of the lid.

The cage for breeding small animals according to the present invention, wherein an end of the water supply apparatus is pivotably connected with the lid using a shaft.

A closed-system cage for breeding small animals, comprising: a casing with an opening on an upper surface thereof; a lid for covering the opening of the casing; and a water supply apparatus, wherein: a partition board is placed to divide a housing section within the casing into a left room and a right room; the partition board comprises a ventilation section for ventilation between one room and the other room of the divided housing section of the casing, and a shielding section for shielding the border between the one room and the other room of the housing section; a communicating section for placing a tip of a nozzle provided with the water supply apparatus is provided at the partition board; an air pipe for sending air into the casing is provided on the lid, and an exhaust pipe for exhausting the air in the casing is provided on the lid; and the air pipe is facing the one room of the housing section in the casing, and the exhaust pipe is facing the other room of the housing section.

A closed-system cage for breeding small animals, comprising: a casing with an opening on an upper surface thereof; a lid attached to the opening of the casing; and a water supply apparatus attached in an openable and closable fashion to an opening for the water supply apparatus formed in the lid, wherein a gripping member facing a part of the opening for the water supply apparatus is attached to a lower surface of the lid.

A closed-system cage for breeding small animals, comprising: a casing with an opening on an upper surface thereof, a lid for covering the opening of the casing, a housing space for small animals within the casing, and a water supply apparatus, wherein the cage comprises: a partition board for dividing the housing space into a plurality of rooms; a ventilation section provided in the partition board for communicatively connecting the plurality of rooms; and a water supply port placing section that is placed in the partition board so that each of the small animals in the plurality of rooms is in contact via a water supply port of the water supply apparatus.

The cage for breeding small animals according to the present invention, wherein the partition board is placed within the casing to divide the space for small animals of the casing into two rooms, and the water supply port placing section is placed at an upper end edge of the partition board.

The cage for breeding small animals according to the present invention, wherein the partition board is placed within the casing to divide the space for small animals of the casing into three or more rooms, and the water supply port placing section is placed at an intersection of the partition board or in a vicinity thereof.

The cage for breeding small animals according to the present invention, wherein the water supply apparatus is attached in an openable and closable fashion to an opening for the water supply apparatus, provided with the lid.

The cage for breeding small animals according to the present invention, wherein: an air pipe for sending air into the casing is provided on the lid, and an exhaust pipe for discharging the air in the casing is provided on the lid; and the air pipe is facing the one room of the housing section in the casing, and the exhaust pipe is facing the other room of the housing section.

The cage for breeding small animals according to the present invention, wherein the ventilation section is formed of a mesh material attached to an opening provided in the partition board, or a passage hole or a slit provided in the partition board.

The cage for breeding small animals according to the present invention, wherein the water supply port placing section is formed by cutting out an upper end edge of the partition board.

The cage for breeding small animals according to the present invention, wherein the water supply port placing section is a passage hole provided in the partition board.

The cage for breeding small animals according to the present invention, wherein the water supply port of the water supply apparatus is a nozzle, and a guiding member for guiding a tip of the nozzle is attached to the water supply port placing section.

The cage for breeding small animals according to the present invention, wherein the guiding member is a cylindrical body, and the tip of the nozzle is insertable into the cylindrical body.

The cage for breeding small animals according to the present invention, comprising a first seal member placed between the casing and the lid, and a second seal member placed between a periphery of the opening for the water supply apparatus formed in the lid and the water supply apparatus.

The cage for breeding small animals according to the present invention, wherein the casing comprises an outer case and an inner case; the partition board is placed in the inner case; an engaging protrusion for retaining the partition board is provided at a bottom portion of the inner case; an engaging recess section, which can engage with the engaging protrusion, is provided at a bottom portion of the partition board; and a protrusion, which can engage with a recess portion provided on a bottom surface side of the engaging protrusion of the inner case, is provided at a bottom portion of the outer case.

The cage for breeding small animals according to the present invention, wherein a gripping member facing a part of the opening for the water supply apparatus is attached to a lower surface of the lid.

The cage for breeding small animals according to the present invention, wherein an end of the water supply apparatus is pivotably connected to the lid using a shaft.

A closed-system cage for breeding small animals, comprising a casing with an opening on an upper surface thereof, a lid for covering the opening of the casing, a housing space for small animals within the casing; and a water supply apparatus, wherein the cage comprises: a partition board for dividing the housing space into a plurality of rooms; a ventilation section provided in the partition board for communicatively connecting the plurality of rooms; a shielding section provided in the partition board for shielding the rooms from one another; and a communicating section, provided at the partition board, for placing a tip of a nozzle provided to the water supply apparatus.

A closed-system cage for breeding small animals, comprising: a casing with an opening on an upper surface thereof; a lid attached to the opening of the casing; and a water supply apparatus attached in an openable and closable fashion to an opening for the water supply apparatus formed in the lid, wherein a gripping member facing a part of the opening for the water supply apparatus is attached to a lower surface of the lid.

Advantageous Effects of Invention

The cage for breeding small animals according to the present invention is a closed system, in which a lid is provided on an opening part of the casing and a water supply apparatus is attached in an openable and closable fashion to an opening part for the water supply apparatus provided on the lid. Thus, pathogenic bacteria of small animals in the cage (in case where the small animals hold any pathogenic bacteria) will not infect small animals in other cages or will not contaminate the facility.

Furthermore, according to the present invention, a partition board is placed within the casing in such a manner to divide a housing section of the casing into a left room and a right room, and a ventilation section for ventilation between the two rooms is provided in the partition board. Thereby, air flows from one room of the housing sections through the ventilation section to the other within the casing. Furthermore, a communicating section for placing a tip of a nozzle of the water supply apparatus is provided in the partition board, thus allowing small animals housed in both one room and the other room of the housing section to drink water from the common water supply nozzle. Because of this, if the small animal housed in the other room of the housing section is infected, it becomes possible to detect that the small animal in the one room of the housing section is also infected with some pathogenic bacteria through aerial infection and/or oral infection.

In particular, when an air pipe faces one room of the housing section within the casing and an exhaust pipe faces the other room of the casing, the air introduced into one room of the casing from the air pipe flows through the ventilation section to the other room of the casing, and the air is then exhausted from the exhaust pipe. As described above, a ventilation path for air is formed within the cage, and pathogenic bacteria of the small animal bred in the upstream side of the housing section readily infect the small animal bred in the downstream side of the housing section.

Besides the ventilation section opened through the partition board, the partition board comprises a shielding section formed with a region other than the opening for dividing the space in the casing into two and shielding the border between one room and the other room. When the area of the open ventilation section accounts for 10 to 50% of the area of the partition board, and even if the amount of air and the velocity of the air introduced into the cage is reduced, air blown into one of the spaces is guided to the other space by the shielding section via the ventilation section, causing air flow within the cage and allowing inside the cage to be fully ventilated. Thus, this allows a ventilation apparatus, which is connected to the cage from outside the cage, to be miniaturized.

Furthermore, the casing is configured with a double casing of an outer case and an inner case, a bottom portion of the inner case is engaged with a bottom portion of the partition board, and the inner case is engaged with the outer case. Thus, the casing can be transported while small animals are housed within the inner case, and the inner case can be disposed of when it becomes dirty. In such a manner, facility and maintenance costs required for animal testing can be minimized, resulting in reducing labor. Furthermore, the inner case can be maintained at a certain degree of cleanness.

Furthermore, in a case where a gripping member facing the opening part for the water supply apparatus is attached to a lower surface of the lid, the gripping member is exposed to the opening when the water supply apparatus is opened. Thus, the tail of the small animal within the casing can be pinched using the fingers or the like from the opening, and the small animal can be allowed to hold on to the gripping member, which makes it possible to securely perform manual immobilization on such small animals during collection of a blood sample or the like from the small animals, which are sensing the presence of humans and are afraid. Since the gripping member is placed on the inside of the lid, contaminants adhered to the gripping member will not be released to the outside air. Furthermore, since an internal mesh, a conventionally used separate member, is not used, the number of parts can be reduced.

Conventionally, when performing examination or other experiments on animals in a cage, the lid and internal mesh of the cage are removed from the casing; a tail of a small animal (e.g., a mouse) within the casing is pinched or picked up one by one using fingers or tweezers from the opening of the casing; and administration of a drug, collection of a blood sample, measuring, or the like is performed on the animal. In doing so, the mouse may struggle. Thus, the mouse is placed on the internal mesh, so that the mouse will grab the internal mesh with its hands. In that state, the mouse is manually immobilized and collection of blood or other procedures is performed. In performing such a procedure, the lid and internal mesh need to be removed from the casing, resulting in making the work troublesome and excessively tiring or damaging to the small animals.

On the other hand, by attaching the gripping member facing the opening part for the water supply apparatus, to the lower surface of the lid as described above, the manual immobilization of small animals can be performed without a need for removing a lid or an internal mesh, thereby providing a cage for breeding small animals with favorable workability, which allows small animals to be taken out easily and safely. Furthermore, the elimination of the use of the separate member, internal mesh, allows the cleaning and sterilization to be omitted.

When an end of the water supply apparatus is pivotably connected with the lid through a shaft, the water supply apparatus need not be removed, which further improves the workability.

BRIEF DESCRIPTION OF DRAWINGS

FIG. 6(*b*) is a cross sectional view of the guiding member.

DESCRIPTION OF EMBODIMENTS

Hereinafter, Embodiments of the present invention will be described with reference to accompanying figures.

Example 1

Figure 16:
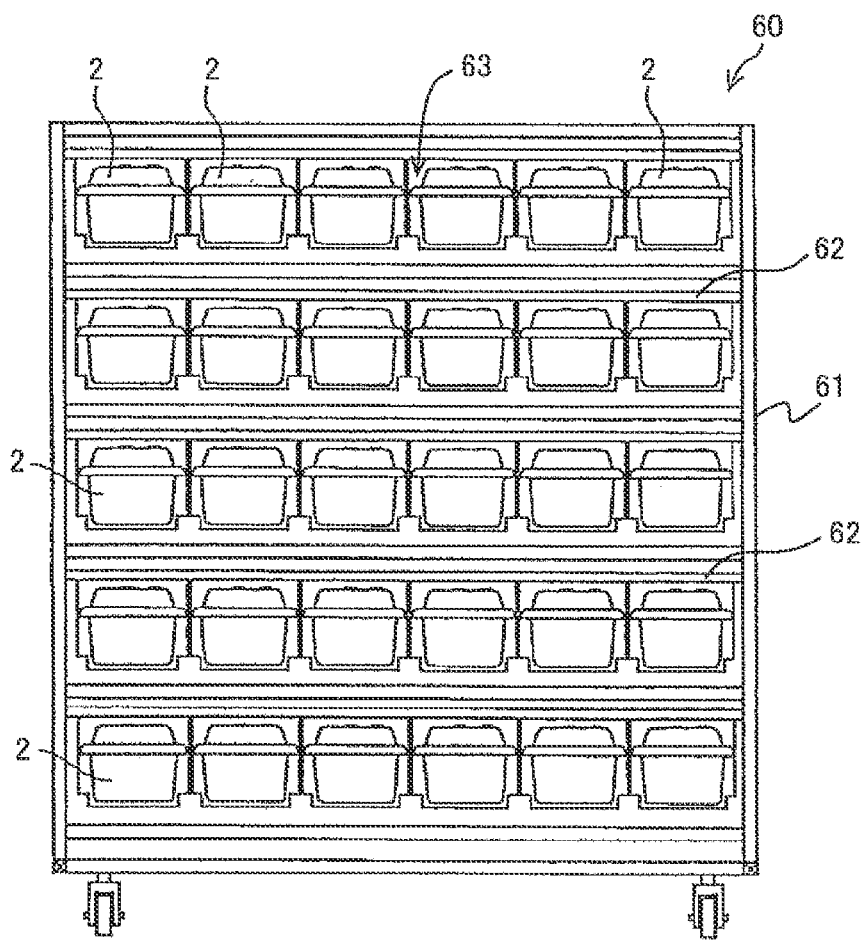
FIG. 16 is an elevation view of a rack housing a plurality of cages for breeding.

As illustrated in FIG. 16, a cage 2 for breeding small animals according to the present invention is mounted in a small animal breeding rack 60 in such a manner that the cage 2 can be inserted and removed through an opening formed on the front side of the rack 60. The rack 60 comprises a rectangular parallelepiped, frame body 61 formed of angles or the like, and a shelf frame 62 for dividing the space of the frame body 61 from top to bottom into a plurality of shelves. A plurality of breeding cages 2 are placed or supported in a suspended manner within a plurality of breeding spaces 63 formed on an upper part of each of the shelf frames 62. Each breeding space 63 has an opening on the front side, and the cage 2 is placed from the opening into the space 63 in such a manner that the cage 2 can be removed from the front.

As illustrated in FIGS. 1 to 4, the cage 2 comprises: a rectangular parallelepiped, casing 4 with an opening on an upper surface thereof; a lid 6 for covering the opening of the casing 4; a water supply apparatus 8 attached in an openable and closable fashion to an opening 33 for the water supply apparatus provided in the lid 6; and a partition board 36 placed within the casing 4 in such a manner to divide a housing section (hereinafter, also referred to as a housing space for small animals or a housing space) of the casing 4 into a left room and a right room.

The cage 2 according to the present invention is a closed system cage. The closed system means that when the lid 6 covers the opening of the casing 4 and the water supply apparatus 8 is attached to the opening 33 for the water supply apparatus of the lid 6, air within the cage 2 will not substantially be released to the outside, and air from the outside will not substantially enter the cage 2, except through an air pipe 15 and an exhaust pipe 14 to be described later. Thus, pathogenic bacteria and contaminants inside the cage 2 will not be released to the outside, and pathogenic bacteria and contaminants outside the cage 2 will not enter the cage 2.

The casing 4 is made of transparent synthetic resin, and a flange 21 elongates outwardly from the periphery of the upper end of the casing 4. Overhanging pieces 22 are projected on the outer side surfaces of the casing 4 and in parallel to the flange 21. By locking the overhanging piece 22 to the protrusion formed on the rack 60, the cage 2 can be supported in a suspended manner in the rack 60.

Figure 4:
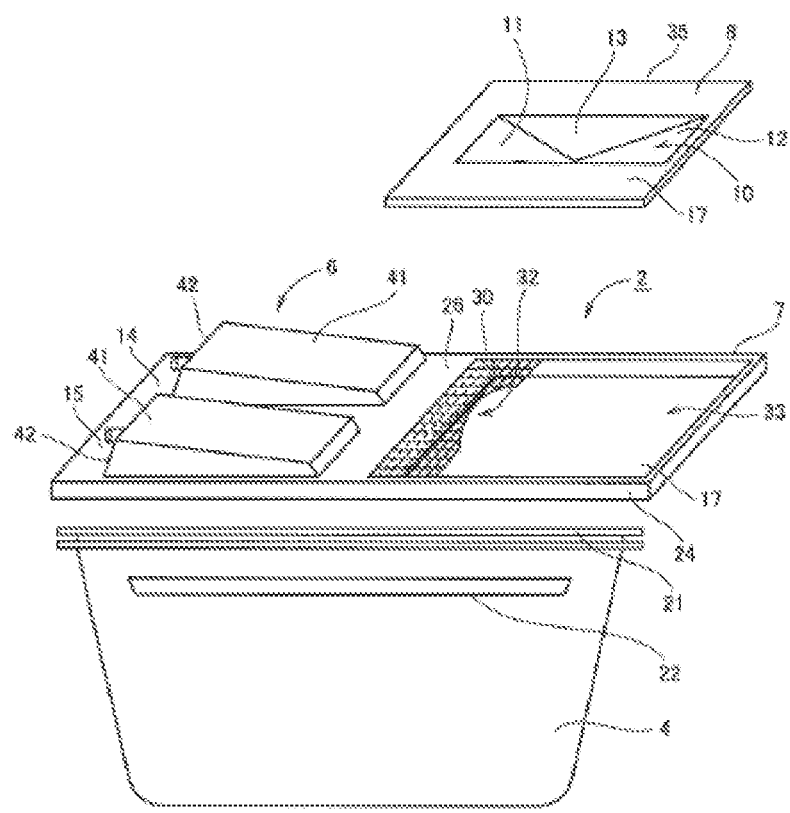
FIG. 4 is a perspective view of a lid and a water supply apparatus of the cage for breeding as illustrated in FIG. 1, separated from a casing.
Figure 5:
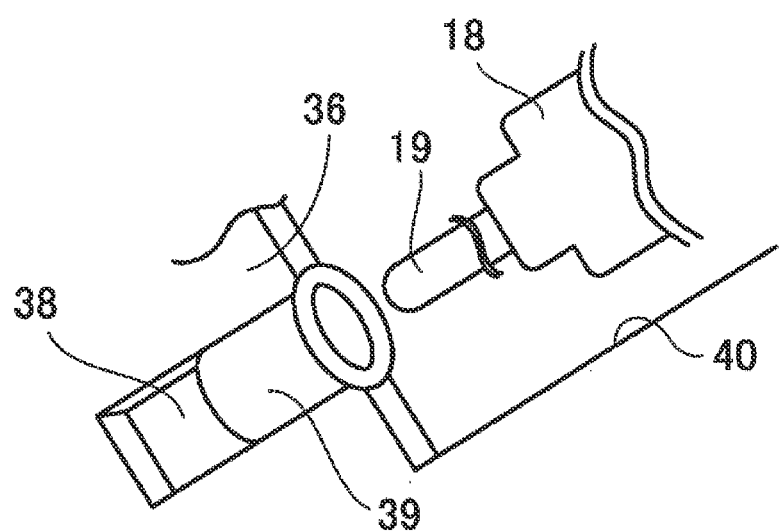
FIG. 5 is a perspective view of an essential part, illustrating a guiding member of a nozzle of a water supply apparatus.
Figure 8:
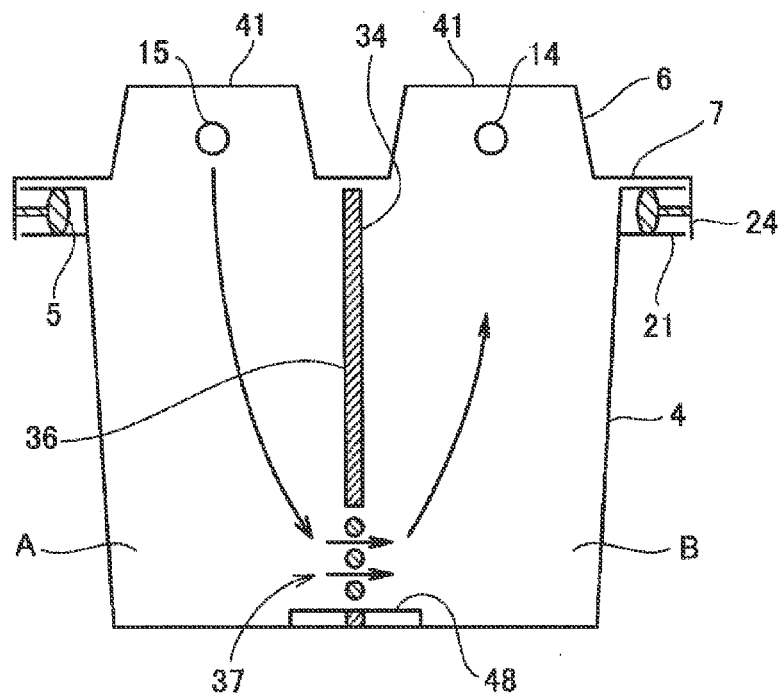
FIG. 8 is a diagram for describing functions of the cage for breeding according to the present invention.

The lid 6 is made of transparent synthetic resin. As illustrated in FIG. 4, the lid 6 comprises a frame body 7 attached to cover an upper end edge of the casing 4; a lid portion 26 for covering a part of the opening of the casing 4; and an opening 33 for a water supply apparatus, attached to the water supply apparatus 8. As illustrated in FIGS. 4 and 8, a folded piece 24 is folded downwardly and formed in the periphery of the frame body 7.

A seal member 5, such as a gasket, is attached to the circumference of the casing 4; and when the lid 6 is attached to the upper surface opening of the casing 4, the seal member 5 elastically comes in contact with the inner part of the folded piece 24, thereby elastically and hermetically retaining the lid 6 to the casing 4 (FIG. 8).

The opening 33 for the water supply apparatus of the lid 6 may account for substantially 40 to 70%, and preferably 45 to 60% in particular, of the total area of the opening of the casing 4. As the area of the opening 33 for the water supply apparatus is set to be large, small animals in the casing 4 can be readily put in and out by the hand through the opening 33.

The water supply apparatus 8 is attached in an openable and closable fashion to the opening 33 for the water supply apparatus of the casing 4. Specifically, a shaft bearing (not shown) is formed at an upper edge in the substantially middle part of the lid 6, and a shaft section 25, formed at an end portion of the water supply apparatus 8, is engaged with the shaft bearing, so that the water supply apparatus 8 will be supported pivotable upward and downward with respect to the lid 6. The water supply apparatus 8 may also be opened and closed by sliding back and forth with respect to the casing 4, along the upper surface of the lid 6.

Figure 1:
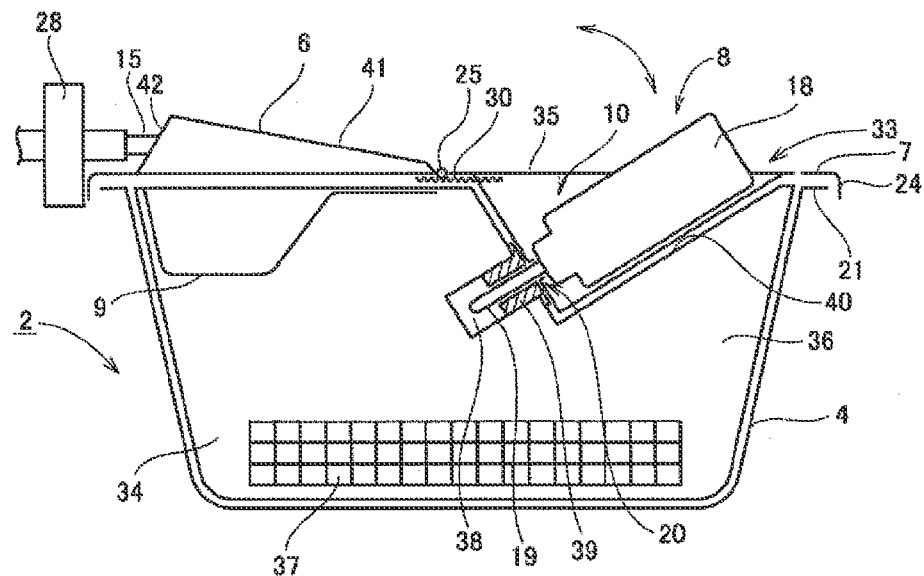
FIG. 1 is a schematic cross-sectional view of a cage for breeding small animals according to an embodiment of the present invention.
Figure 2:
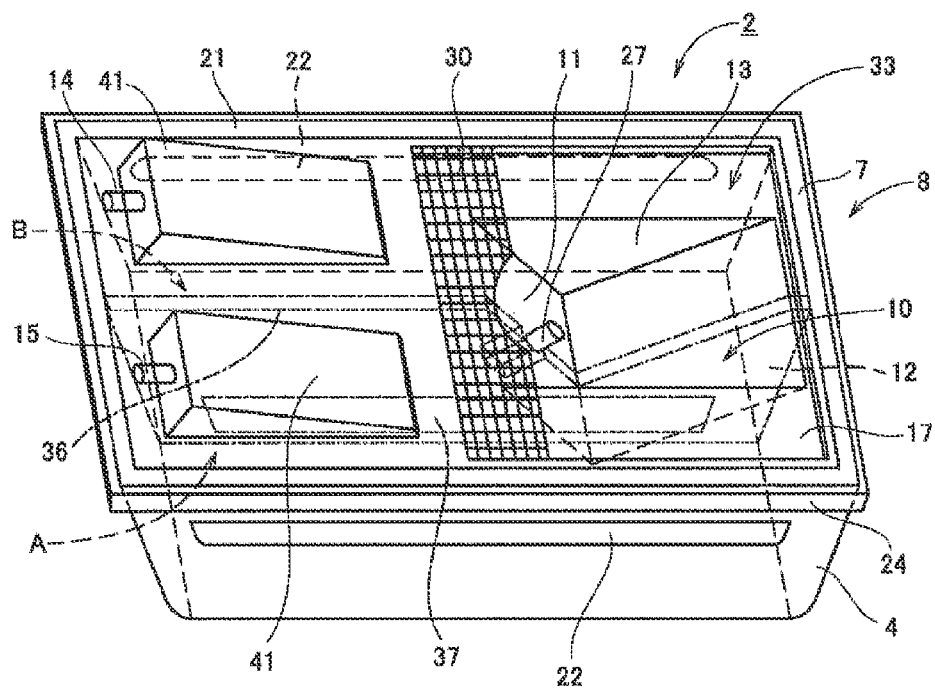
FIG. 2 is a perspective view of the cage for breeding as illustrated in FIG. 1.
Figure 3A:
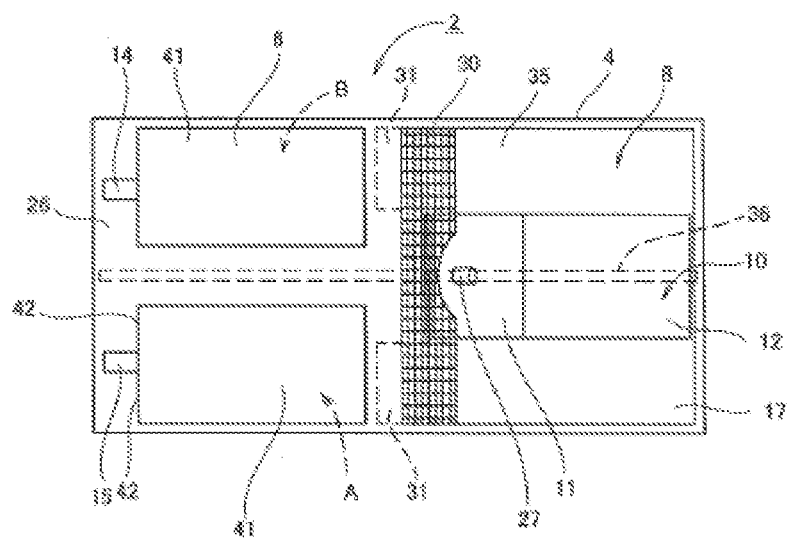
FIG. 3A is a plane view of the cage for breeding as illustrated in FIG. 1.
Figure 3B:
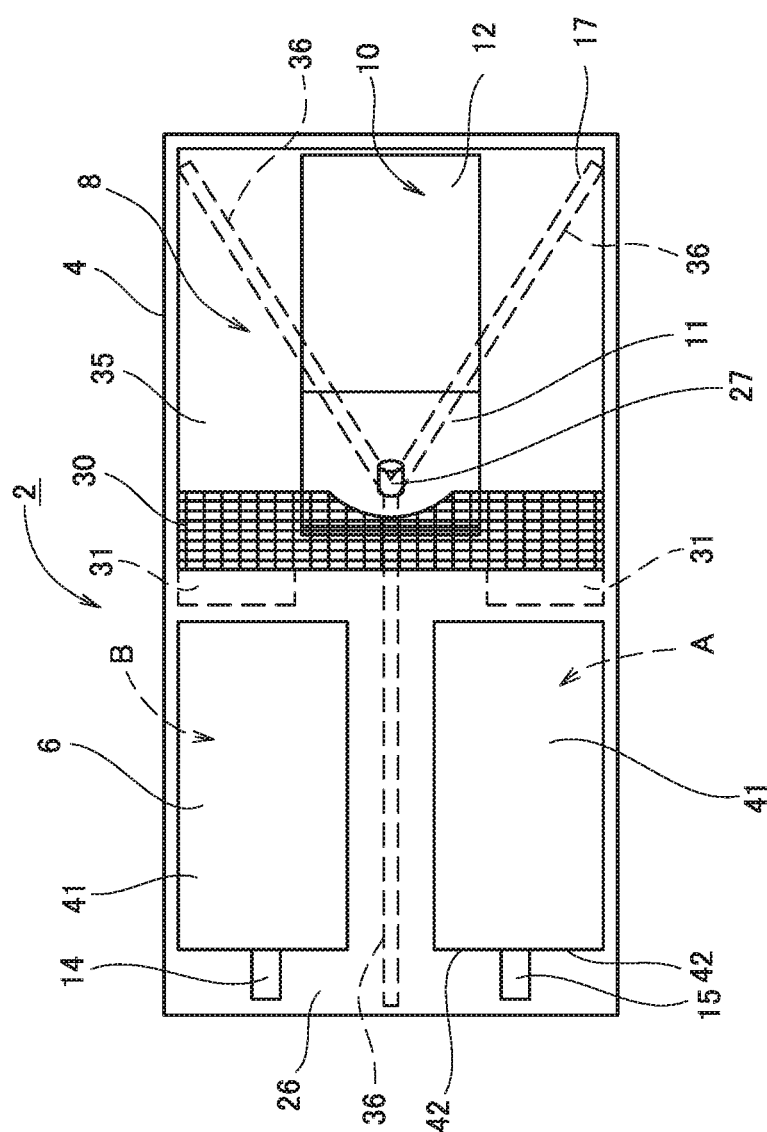
FIGS. 3B and 3C are plane views of the cage for breeding in other embodiments of the present invention.
Figure 3C:
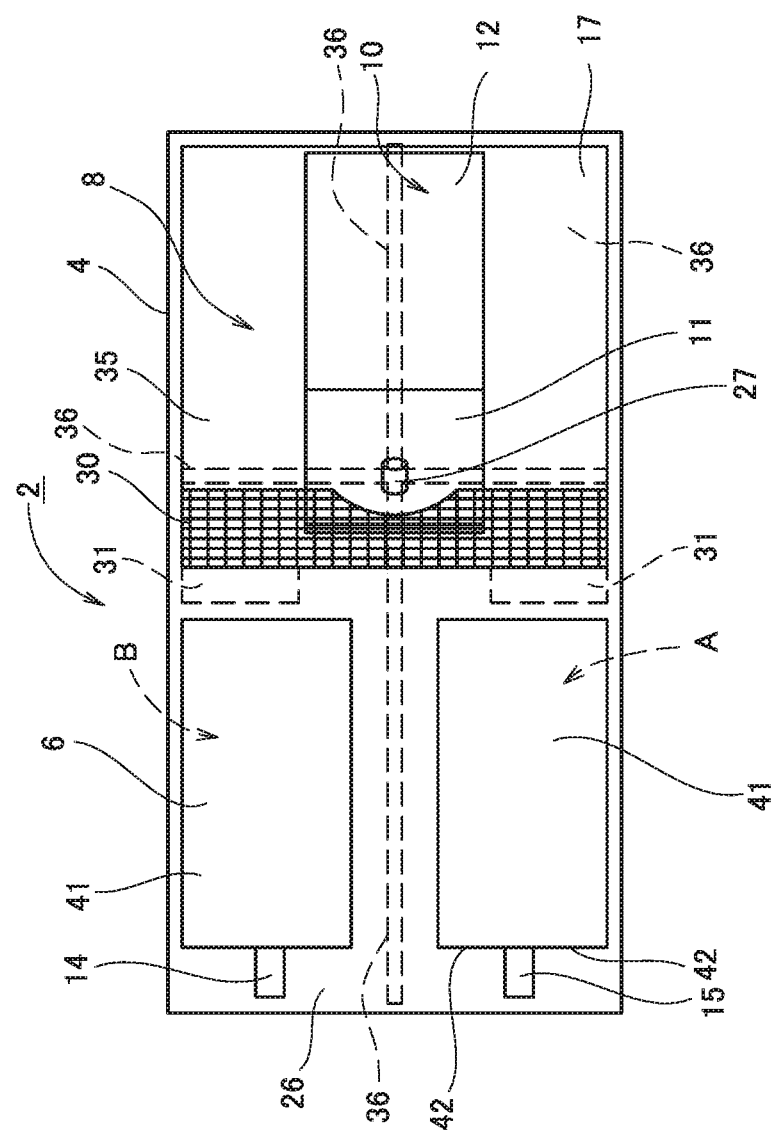

The water supply apparatus 8 comprises: a receiving member 35 placed in an openable and closable fashion to the opening 33 for the water supply apparatus of the casing 4; and a water supply bottle 18 detachably placed in the receiving member 35. The receiving member 35 comprises an upper piece 17 and a recess section 10 formed in the upper piece 17, the recess section 10 being triangle-shaped from the side view. The recess section 10 comprises a first tilting piece 11, a second tilting piece 12, and side pieces 13 and 13. The first tilting piece 11 is formed with a passage hole 20 for inserting a nozzle (water supply port of the water supply apparatus) 19 of the water supply bottle 18 (FIG. 1).

An elastic member, such as a gasket, is attached to the circumference of the opening 33 for the water supply apparatus of the casing 4. When the water supply apparatus 8 is attached to the opening 33 for the water supply apparatus, the receiving member 35 of the water supply apparatus 8 is hermetically attached to the opening 33. The elastic member may also be provided in the circumference of the receiving member 35 of the water supply apparatus 8, instead of providing it in the circumference of the opening 33 for the water supply apparatus. Alternatively, the peripheral edge of the opening 33 for the water supply apparatus and the receiving member 35 of the water supply apparatus 8 may be engaged with each other in a substantially hermetic manner.

A cylindrical body 27 is projected in the circumference of the passage hole 20 formed in the first tilting piece 11. In addition, a ring-shaped, seal member for a bottle is attached to a nozzle 19 of the water supply bottle 18. When the water supply bottle 18 is placed within the recess section 10 and the nozzle 19 of the water supply bottle 18 is inserted through the passage hole 20, the seal member for the nozzle of the water supply bottle 18 elastically comes in contact with (hermetically engages with) the inner surface of the cylindrical body 27. For example, an elastic packing, an O-ring or the like can be used for the seal member for the bottle.

As illustrated in FIGS. 1 to 4, bulge sections 41 and 41 extended in the front and back direction of the casing are formed in the lid 6. At wall sections 42 and 42 in the back of the bulge sections 41 and 41, an exhaust pipe 14 and an air pipe 15 are provided in such a manner to protrude in the back direction (towards the back of the cage). The exhaust pipe 14 and air pipe 15 may be formed integratedly with the lid 6. Alternatively, the exhaust pipe 14 and air pipe 15 may be configured with a member different from the lid 6 and they may be attached to the wall sections 42 of the lid 6. Alternatively, the exhaust pipe 14 and air pipe 15 may be provided on the upper surface of the lid 6. The exhaust pipe 14 and air pipe 15 are connected with a filter 28.

The partition board 36 is formed by processing a board, such as a plastic board or a metal board. The partition board 36 may be placed within the casing 4 in a vertical direction so as to divide the housing section of the casing 4 into substantially equally divided left and right rooms. Specifically, the partition board 36 is extended in the front and back direction or the width direction of the casing 4, and is placed within the casing 4. The partition board 36 may be fixed by an engaging section, such as a protruding or recessed portion, provided at a bottom portion or an inner wall of the casing 4. In the embodiment illustrated in FIG. 1, a feeding apparatus 9 made of a metallic wire material is placed in a part of the opening of the casing 4, and the upper part of the partition board 36 placed in the longitudinal direction is inserted through the wire material of the feeding apparatus 9, so that the partition board 36 can be retained within the casing 4.

In a state where the partition board 36 is provided within the casing 4, a space that does not allow small animals to pass through, or no substantial space, is formed between the side edge portion of the partition board 36 and the side surface of the casing 4, between the lower end portion of the partition board 36 and the bottom surface of the casing 4, and between the upper end portion of the partition board 36 and both the lower surface of the lid 6 and the water supply apparatus 8.

The partition board 36 is provided with a ventilation section 37 for ventilation between one room and the other room of the housing section within the casing 4. Although it is well known, the ventilation section 37 is for allowing a source of contamination, such as viruses in the air, located in one room to effectively flow into another room. For this purpose, it is desirable that the ventilation section 37 is provided toward the lower side (bottom surface direction) of the shielding board. This is natural in order for the source of contamination to effectively mix into air in another room. The ventilation section 37 is formed in a size that allows air to flow from one room to the other room of the housing section within the casing 4 and that does not allow small animals to pass through.

The ventilation section 37 can be formed by, for example, placing a mesh material at an opening formed in the partition board 36, or providing a large number of passage holes or a large number of slits in the partition board 36.

It is preferable that the ventilation section 37 is positioned toward the lower portion of the partition board in order to effectively infect a non-subject animal with, for example, a certain pathogenic microbe, which is carried by a subject animal. However, needless to say, it is of course not essential that the ventilation section 37 is provided at a lower position. The opening area of the ventilation section 37 is preferably 5 to 60%, more preferably 10 to 50%, and most preferably 15 to 30%, of the total area of the partition board 36 viewed from the side of the partition board 36.

By a shielding section 34 of the partition board 36 with no ventilation section 37 provided therein, the flow of air within the cage can be guided.

Furthermore, a water supply apparatus receiving portion 40 for receiving the water supply apparatus 8, such as a recess portion, is provided at an upper edge of the partition board 36. Needless to say, the water supply apparatus receiving portion 40 may be provided at any position of the partition board 36.

In continuation to the water supply apparatus receiving portion 40, a communicating section (spatial portion) 38 is formed by cutout, for placing the nozzle 19 provided at a tip of the water supply bottle 18 of the water supply apparatus 8. The communicating section 38 is a space for communicating one room A and the other room B of the housing section of the casing 4 with each other. In the present Embodiment, the communicating section 38 is regarded as a water supply port placing section.

The communicating section 38 for disposing the tip of the nozzle 19 can be provided at any position of the partition board 36. In the present example, the communicating section 38 is formed by cutting out a part of the upper end edge of the partition board 36 into a rectangular shape so as to allow the tip of the nozzle 19 to be placed therein. When a tip portion of the nozzle 19 of the water supply bottle 18 is placed at the communicating section 38, small animals housed in both the room A and the other room B of the housing section of the casing 4 will drink water from the nozzle 19. This will spread an oral infection among the small animals.

The communicating section 38 is sized such that small animals are allowed to drink water from the tip of the nozzle 19 and they are not allowed to pass through the communicating section 38.

A guide member 39 for guiding the nozzle 19 to the communicating section 38 is placed. As illustrated in FIG. 5, the guide member 39 can be formed in a cylindrical shape. The guide member 39 is fixed to the side wall of the partition board 36 within the communicating section 38. The tip of the nozzle 19 of the water supply bottle 18 can be securely retained by the guide member 39. Even if the water supply bottle 18 is pulled out from the recess section 10 of the water supply apparatus 8 to add water into the water supply bottle 18 or exchange water within the water supply bottle 18, the guide member 39 placed in the communicating section 38 securely prevents small animals from moving through the communicating section 38 to a different side of the housing section.

As illustrated in FIG. 6, the guide member 39 may also be formed with a curved board. By fixing a pair of boards on both sides of the partition board 36, facing the communicating section 38, a passage hole will be formed for passing the nozzle 19 through between the pair of boards.

As illustrated in FIG. 7, the communicating section 38 can also be formed with the passage hole provided in the partition board 36. A tip 191 of the nozzle 19 of the water supply bottle 18 placed at the recess section 10 of the water supply apparatus 8 is positioned in such a manner to face the communicating section 38. Thus, it is a matter of course that not only the small animals in a room A of the casing 4, for which the nozzle 19 is placed, can drink water from the nozzle 19, but also the small animals in a room B of casing 4, in which the nozzle 19 is not placed, can drink water from the nozzle tip 191 positioned at the communicating section 38. The shape and size of the communicating section 38 are not limited to those described above. The communicating section 38 is designed so that small animals can take advantage of the water from the nozzle tip 191 through the communicating section 38 and further so that the small animals will not be able to pass through the communicating section 38. While it is not a particular problem for the tip of the nozzle 19 to swing around, a retaining member for retaining the nozzle 19 may be attached to the partition board 36 in order to prevent the nozzle tip from swinging around.

The air pipe 15 provided with the lid 6 is facing the divided room A within the casing 4, and the exhaust pipe 14 is facing the divided room B within the casing 4. Thus, as illustrated in FIG. 8, air sent from the air pipe 15 into the casing 4 is guided by the shielding section 34 of the partition board 36 to flow in the room A of the housing section within the casing 4, and the air goes through the ventilation section 37 of the partition board 36 and is exhausted from the other room B of the housing section through the exhaust pipe 14.

A gripping member 30 is supported in a cantilever fashion at a lower surface of a lid portion 26, and most of the gripping member 30 is placed on the side of the lower surface of the receiving member 35 of the water supply apparatus 8 (FIG. 4). When the water supply apparatus 8 is pivoted upwardly and the opening 33 is opened, the gripping member 30 is exposed to the outside from the opening 33. The size of the gripping member 30 protruding over the opening 33 can be set as appropriate.

Figure 9:
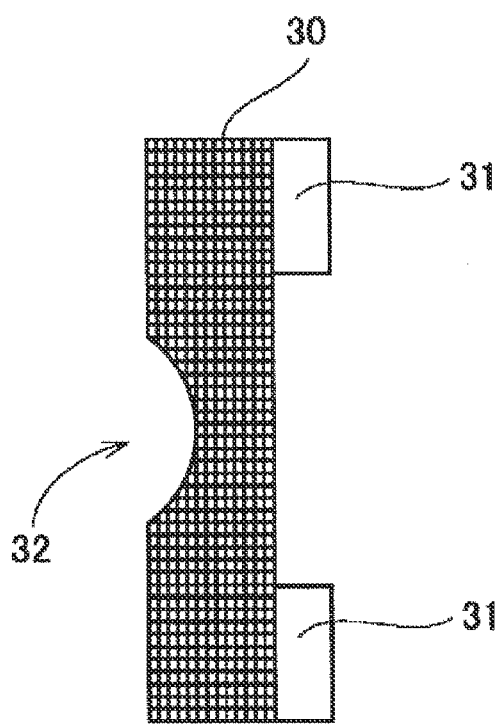
FIG. 9 is a plane view of a gripping member used for the cage for breeding.
Figure 10:
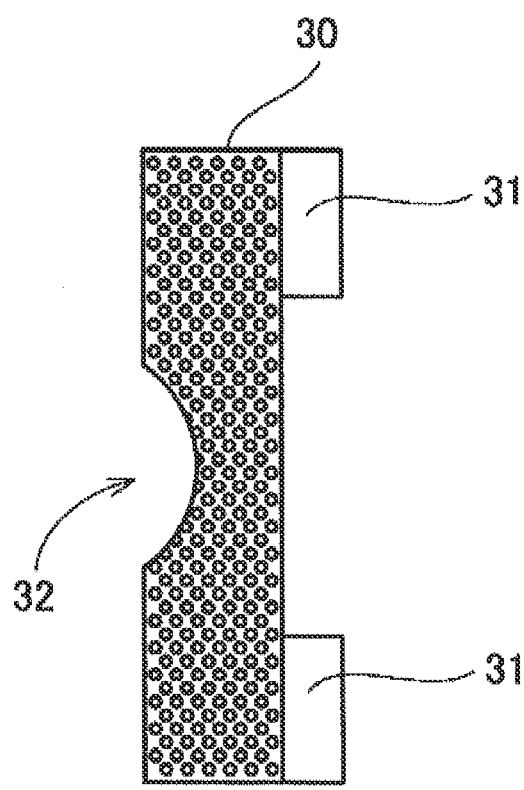
FIG. 10 is a plane view of a gripping member in another embodiment, used for the cage for breeding.

There is no particular significance in the material for the gripping member 30, and any material can be used as long as the gripping member 30 includes some openings that will not allow small animals to escape through to the outside. The gripping member 30 is generally formed with a mesh material, such as a wire net, a resin mesh (FIG. 9), a lattice, a resin or metal receiving member 35 with a large number of holes formed therein (FIG. 10), or the like. A fixation piece 31 is attached to an end portion of the gripping member 30, and the fixation piece 31 is fixed on a lower surface of the lid portion 26 by means of a fixing means, such as an adhesive, welding or a screw. A free end portion of the gripping member 30 is provided with a cutout recess section 32 so that a hand can be readily inserted from the opening 33 into the casing 4.

Next, a method for using a cage 2 for breeding small animals according to the present invention will be described.

By pivoting the water supply apparatus 8 upwardly, a subject animal obtained from the outside is put into the room A of the housing section (housing section provided with the air pipe 15) of the casing 4 from the opening 33, a non-subject animal for monitoring is put into the other room B of the housing section (housing section provided with the exhaust pipe 14), and the water supply apparatus 8 is attached to the opening 33. In such a condition, the cage 2 is placed at a breeding space 63 of the small animal breeding rack 60. A rack-side exhaust pipe connected to a ventilation apparatus is connected with the exhaust pipe 14 of the cage 2, and a rack side air pipe connected to the ventilation apparatus is connected with the air pipe 15 of the cage 2. By running the ventilation apparatus, air inside the cage 2 is ventilated (FIG. 8). When the air inside the cage 2 flows from the air pipe 15 to the exhaust pipe 14, the air is guided by the partition board 36. Thus, the air will not stay within the casing 4.

Since the partition board 36 is provided with the ventilation section 37 for ventilation between the one room and the other room of the housing section, the air within the room A of the housing section flows to the other room B of the housing section through the ventilation section 37. In addition, since the communicating section 38 for placing a tip of the nozzle 19 of the water supply bottle 18 is provided at the partition board 36, small animals both in the rooms A and B of the housing section drink water from the nozzle 19. Thus, pathogenic bacteria or the like of the small animal in the room A will be easily infected to the small animal in the room B through aerial infection and oral infection. In addition, since the opening of the casing 4 is substantially sealed in a hermetical manner by the lid 6 and the water supply apparatus 8, the pathogenic bacteria and contaminant in the cage 2 will not leak outside the cage 2.

When the small animals in the cage 2 are examined or other experiments are conducted on the small animals, the cage 2 is pulled out of the rack 60, or the cage 2 is moved from the rack 60 to another location (such as a clean bench or a biohazard bench), and then the water supply apparatus 8 of the cage 2 is opened and a tail of the small animal in the casing 4 is pinched or picked up using fingers or tweezers through the opening 33. In doing so, the small animal may struggle, and thus the small animal is allowed to grab the gripping member 30 protruding on the side of the opening 33. In this state, manual immobilization is performed on the small animal.

As described above, when genetically modified small animals are introduced from the outside to conduct an experiment or the like on the small animals, a small animal (subject animal) is housed in one room of the housing section, and a decoy animal (non-subject animal) is housed in the other room of the housing section. After breeding the small animals for a certain period of time, the decoy animal is examined periodically and repeatedly for the presence of specific microorganisms. This either confirms or guarantees the quality of such genetically modified small animals, and confirms or guarantees that an animal test with no involvement of pathogenic microorganisms has been conducted.

According to the present embodiment, the air pipe 15 and exhaust pipe 14 provided with the cage are connected to the ventilation apparatus, and fresh air is introduced from the air pipe 15 into the cage 2 and the air within the cage 2 is exhausted from the exhaust pipe 14. With regard to the air introduced into the cage, in order to maintain cleanness of the inside of the cage, the cage is ventilated 40 to 60 times per hour (the amount of ventilation is the volume of the cage×40 to 60 times per hour) and the wind velocity in the cage is set to be 20 to 30 m per hour. These airflow and wind velocity are the same as those of a typhoon for the small animals. Due to this, the influence on the small animals by the air current is significant, and it is speculated that the air current has adverse effects on the biology. Accordingly, provision of an appropriate breeding environment is required.

The partition board disclosed in Patent Literature 2 is configured by stretching a wire net on an outer frame. Thus, when this cage is used and air within the cage is ventilated, the airflow and wind velocity as set above will be necessary.

By providing the ventilation section 37 in a part of the partition board 36 placed within the cage and also providing the shielding section 34 in the other part of the partition board 36 as described in the present embodiment, the air introduced from the air pipe to the cage passes through the ventilation section 37 of the partition board 36, and then from one room of the housing section to the other room. Thus, a circulation path for air is created in the cage. As a result, even if the airflow and wind velocity in the cage are reduced, the cage can be sufficiently ventilated, which provides an appropriate breeding environment for the small animals within and which enables the miniaturization of the ventilation apparatus.

Embodiment 2

While a partition board 36 is placed within a single casing 4 in the embodiment described above, the casing 4 may be constituted of an outer case 46 and an inner case 43 and a partition board 36 may be placed within the inner case 43.

Figure 11:
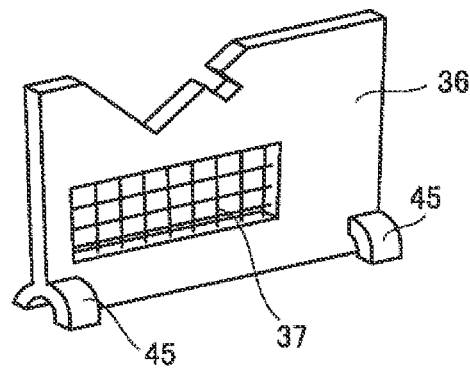
FIG. 11 is an exploded perspective view of the cage for breeding in another embodiment.
Figure 11:
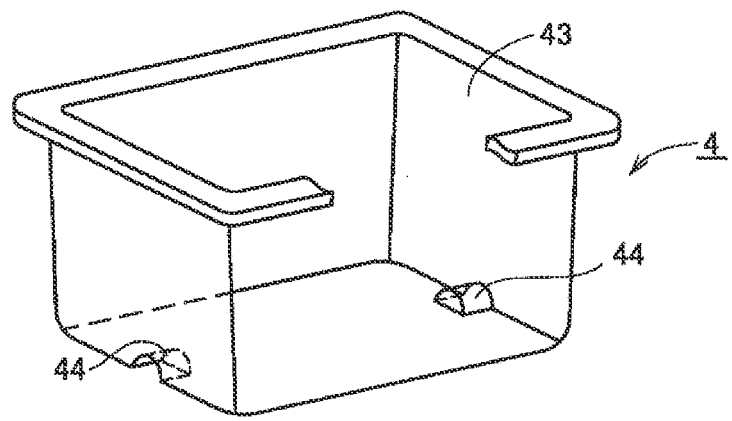
Figure 11:
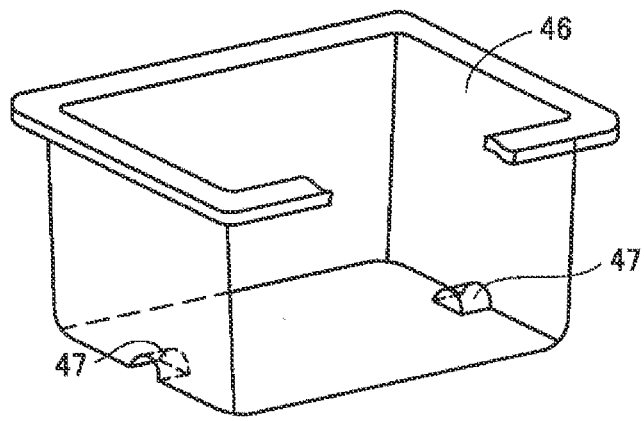
Figure 12:
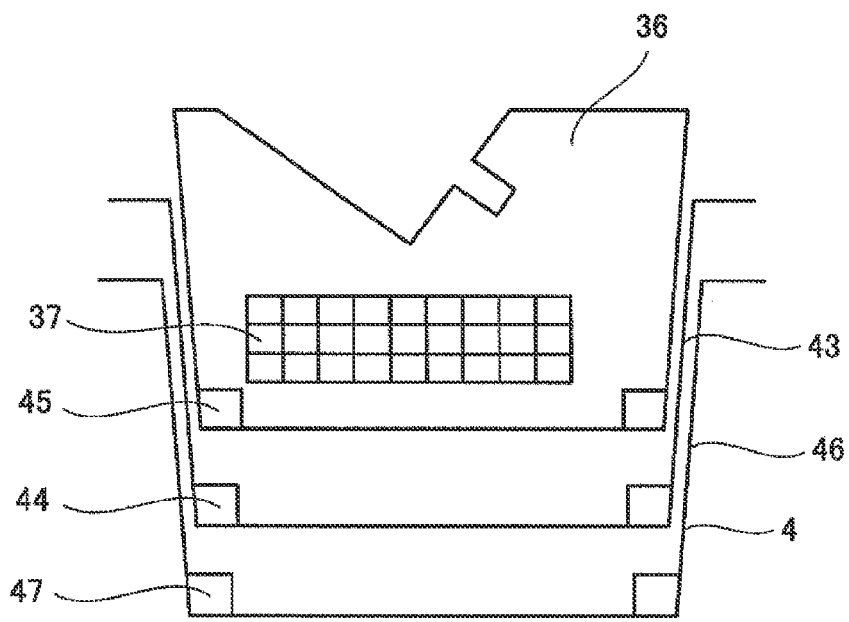
FIG. 12 is a schematic view for describing the cage for breeding as illustrated in FIG. 11.
Figure 13:
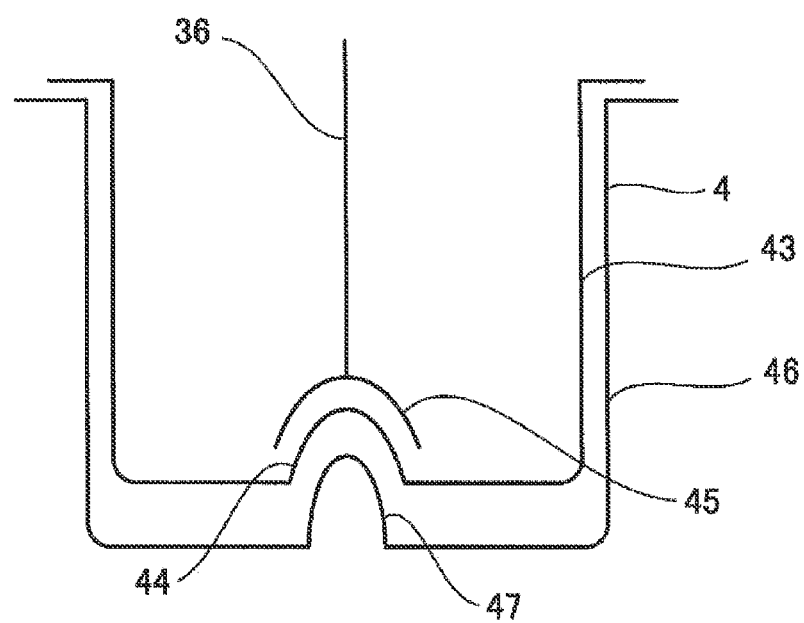
FIG. 13 is a schematic view for describing the cage for breeding as illustrated in FIG. 11.

In such a case, as illustrated in FIGS. 11 to 13, an engaging protrusion 44 for retaining a partition board 36 is provided at each of both side ends on a bottom portion of the inner case 43. An engaging recess section 45, which can engage with the engaging protrusion 44, is provided at each of both side ends of a bottom portion of the partition board 36. In addition, a protrusion 47 is provided at each of both side ends on a bottom portion of the outer case 46, and the protrusion 47 can engage with a recess portion provided on a bottom surface side of the engaging protrusion 44 of the inner case 43.

With such a configuration, it becomes possible to attach the partition board 36 easily in a state where the partition board 36 is standing within the casing 4. In addition, the use of the inner case 43 enables to transfer the inner case 43 while housing small animals therein. This allows the transferring of small animals to be performed easily and without putting the small animals under stress. If the inner case 43 is contaminated, such a relatively inexpensive inner case 43 can be removed from the outer case 46 and disposed of, which is hygienic and economical.

The surfaces of the engaging protrusion 44 and protrusion 47 described above are curved, which prevents small animals from gnawing the engaging protrusion 44 and protrusion 47. Furthermore, these members can be piled up to be stored and sterilized.

Figure 6:
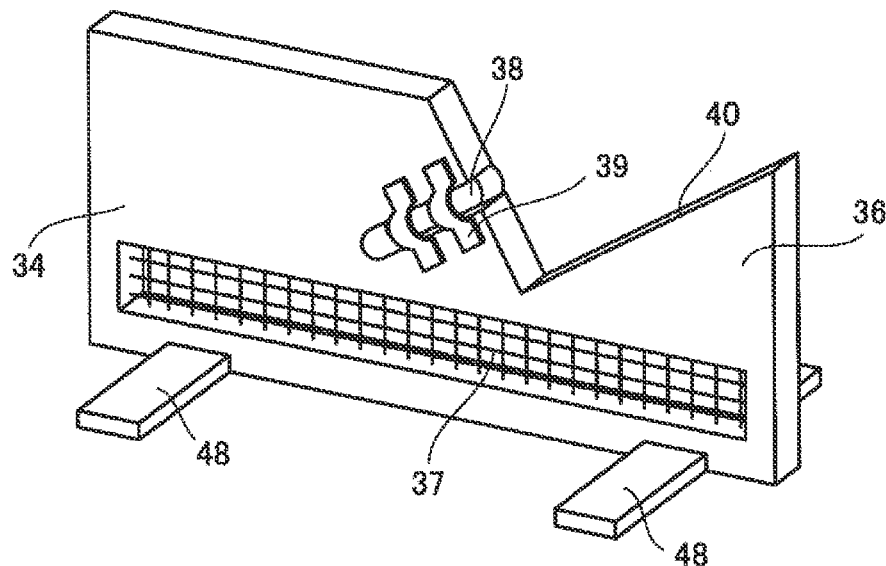
FIG. 6(*a*) is a perspective view illustrating a guide member in another embodiment.
Figure 6:
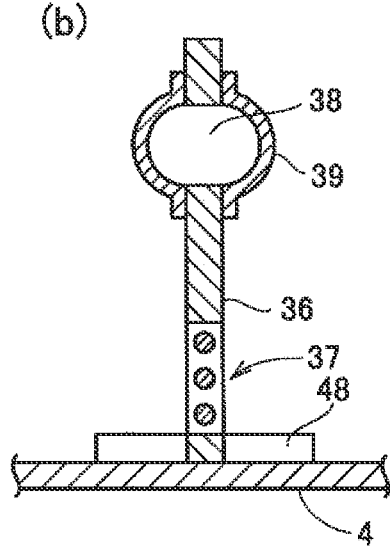
Figure 7:
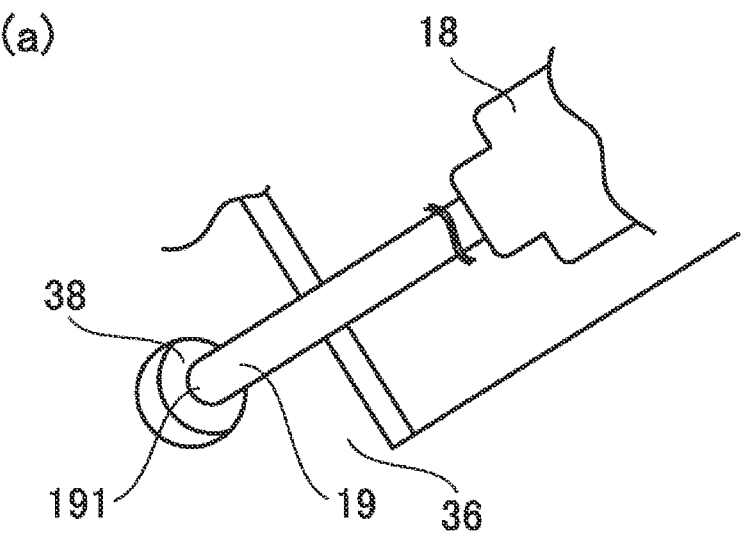
FIG. 7(a) is a perspective view illustrating a communicating section in another embodiment.
FIG. 7(b) is a cross sectional view of the communicating section.
Figure 7:
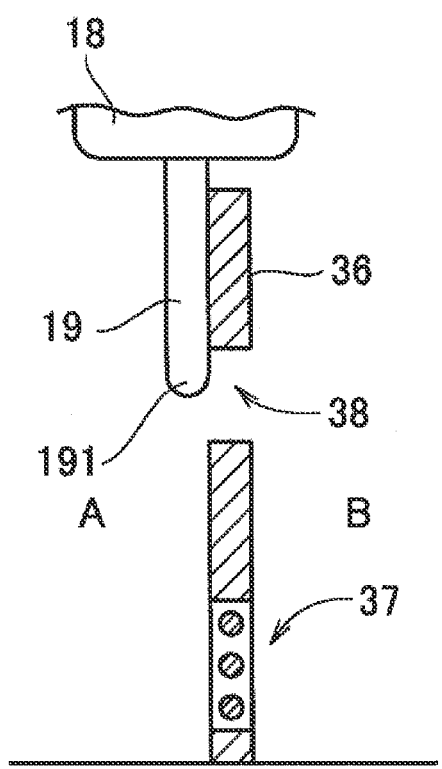

As illustrated in FIG. 6, a horizontal supporting plate 48 may be fixed to the lower end of the partition board 36 in order to maintain the partition board 36 vertically within the casing 4.

Figure 14:
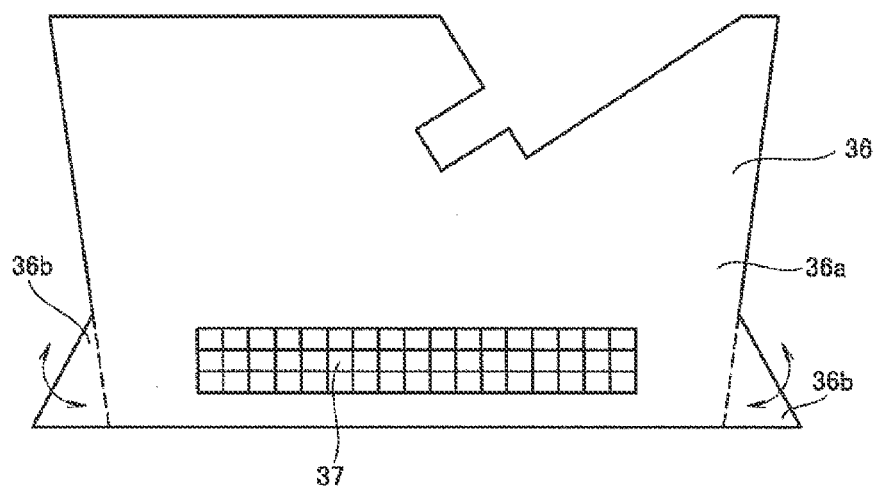
FIG. 14(a) is an elevation view of a partition board in another embodiment.
FIG. 14(b) is a plane view of the partition board.
Figure 14:
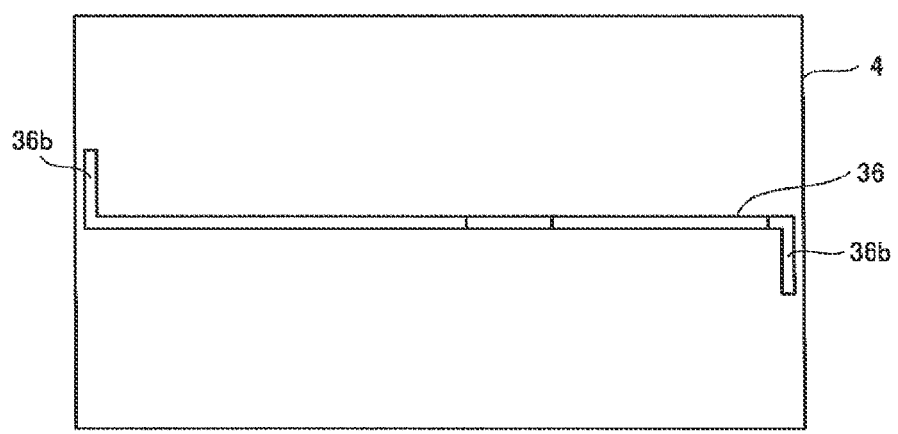

FIG. 14 illustrates another embodiment of the partition board 36.

The partition board 36 comprises a plate-like partition board main body 36a; and bendable pieces 36b bendably formed on both sides of the lower end part of the partition board main body 36a. As illustrated in FIG. 14(b), when the partition board 36 is used within the casing 4, two bendable pieces 36b and 36b are bent opposite one another for example, so that the partition board 36 can be self-supported within the casing 4.

By configuring the partition board 36 as described above, the partition board 36 can be manufactured at a low cost, and further, the partition board 36 can be readily attached in a standing state within the casing 4. Further, a plurality of partition boards 36 can be piled up to store or sterilize them.

Embodiment 3

Figure 15:
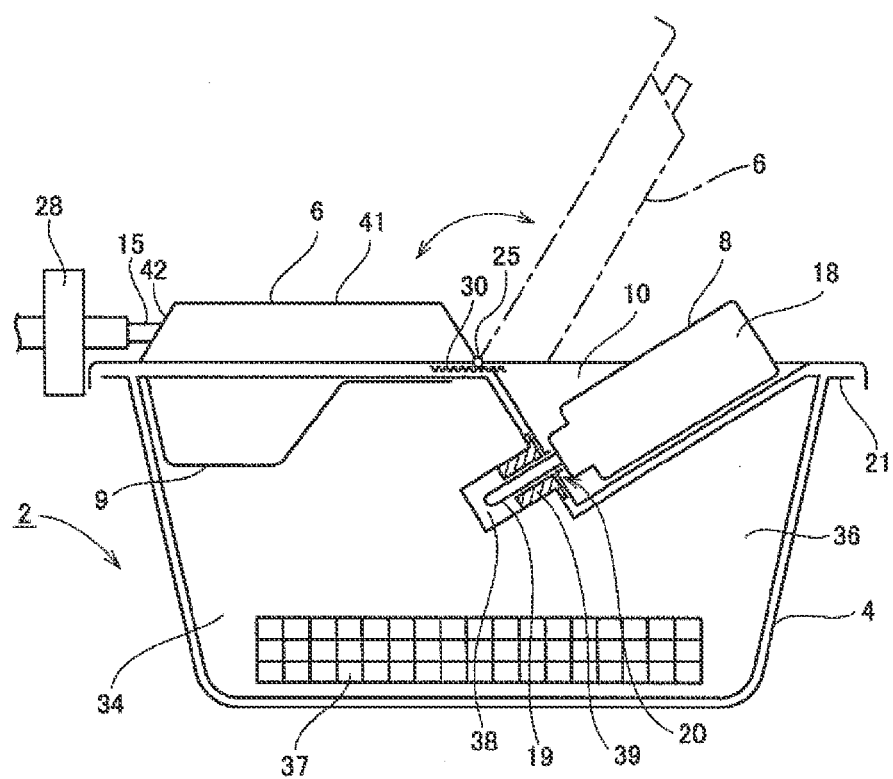
FIG. 15 is a schematic cross-sectional view of the cage for breeding in still another embodiment of the present invention.

FIG. 15 illustrates a still another embodiment of the present invention.

In the present embodiment, a lid 6 for covering an opening on an upper surface of a casing 4 is attached in an openable and closable fashion to a part of the opening, and a water supply apparatus 8 is attached on a different part of the opening.

A shaft section 25 is formed at an end portion of the lid 6. A shaft bearing (not shown) is formed at an upper edge in the substantially middle part of the casing 4. The shaft bearing engages with the shaft section 25. The engagement of the shaft section 25 of the lid 6 with the shaft bearing allows the lid 6 to be supported pivotable upward and downward with respect to the lid 6.

A gripping member 30 is supported in a cantilever fashion with a water supply apparatus 8 located therebelow, and most of the gripping member 30 is placed below the lower surface of the lid 6. When the lid 6 is pivoted upward, the gripping member 30 is exposed from the opening to the outside.

As indicated by the arrow in FIG. 15, the lid 6 is retained to the casing 4 during the pivoting of the lid 6, so that the lid 6 can be retained in a tilting state when the lid 6 is opened. This improves workability. The lid 6 may also be opened and closed by sliding back and forth with respect to the casing 4, along the upper surface of the casing 4. A filtering apparatus 28 may also come between a rack side exhaust pipe and an exhaust pipe 14 of a cage 2, and a rack side air pipe and an air pipe 15 of the cage 2.

In each of the embodiments described above, the partition board 36 was provided within the casing 4 so that the housing section (housing space for small animals) of the casing 4 is divided into left and right rooms. However, the partition board 36 may be a partition for dividing the housing space into a plurality of rooms. For example, the partition board 36 may be a partition for dividing the housing space into not only two rooms, but also three rooms, four rooms, or 5 or more rooms.

A breeding cage comprises the water supply port placing section that is placed in the partition board so that each of the small animals in the plurality of rooms is in contact via a water supply port (e.g., nozzle) of the water supply apparatus. For example, the water supply port placing section may be the communication section described above.

When the housing space is divided into three rooms, the partition board can be constructed by combining three components into a Y shape in a plane view. The water supply port placing section is placed at a connection section (intersection of the partition board or in the vicinity thereof) of the three components. The ventilation section that communicatively connects the plurality of rooms is formed on each component.

When the housing space is divided into four rooms, the partition board can be constructed by combining four components into a cross shape in a plane view. The water supply port placing section is placed at a connection section (intersection of the partition board or in the vicinity thereof) of the four components. The ventilation section that communicatively connects the plurality of rooms is formed on each component. In each of the embodiments described above, the partition board 36 comprises: a ventilation section 37; and a shielding section 34 for shielding the border between one room and the other room of the housing section in the casing 4. However, the partition board 36 may be formed with a wire net, a resin board with a large number of small holes formed therein, an outer frame with a wire net stretched thereon, or the like.

For the feeding apparatus 9 described above, the one made of metal wire is provided at a part of the opening of the casing 4. However, the feeding apparatus 9 may also be provided on the side closer to the water supply apparatus 8. Alternatively, the feeding apparatus 9 may be placed within the casing 4.

INDUSTRIAL APPLICABILITY

According to the present invention, a cage for breeding small animals is provided, which is used when small animals such as rats, mice and guinea pigs are bred in isolation.

REFERENCE SIGNS LIST 2 cage for breeding
24 casing
26 lid
27 frame body
28 water supply apparatus
214 exhaust pipe
215 air pipe
219 nozzle
226 lid portion
230 gripping member
235 receiving member
236 partition board
237 ventilation section
238 communicating section

The invention claimed is:

1. An air tightly closed-system cage for breeding small animals, comprising: a casing with an opening on an upper surface thereof, a lid for covering the opening of the casing, a housing space for small animals within the casing, and a water supply apparatus, wherein the cage comprises:
an air pipe for sending air into the casing;
an exhaust pipe for discharging the air in the casing;
a partition board for dividing the housing space into a plurality of rooms;
a ventilation section provided in the partition board for communicatively connecting the plurality of rooms; and
a water supply port placing section that is placed in the partition board so that each of the small animals in the plurality of rooms is in contact via a water supply port of the water supply apparatus.

2. The cage for breeding small animals according to claim 1, wherein the partition board is placed within the casing to divide the space for small animals of the casing into two rooms, and the water supply port placing section is placed at an upper end edge of the partition board.

3. The cage for breeding small animals according to claim 1, wherein the partition board is placed within the casing to divide the space for small animals of the casing into three or more rooms, and the water supply port placing section is placed at an intersection of the partition board or in a vicinity thereof.

4. The cage for breeding small animals according to claim 1, wherein the water supply apparatus is attached in an openable and closable fashion to an opening for the water supply apparatus, provided with the lid.

5. The cage for breeding small animals according to claim 4, comprising a first seal member placed between the casing and the lid, and a second seal member placed between a periphery of the opening for the water supply apparatus formed in the lid and the water supply apparatus.

6. The cage for breeding small animals according to claim 4, wherein a gripping member facing a part of the opening for the water supply apparatus is attached to a lower surface of the lid.

7. The cage for breeding small animals according to claim 1, wherein:
an air pipe for sending air into the casing is provided on the lid, and an exhaust pipe for discharging the air in the casing is provided on the lid; and
the air pipe is facing the one room of the housing space in the casing, and the exhaust pipe is facing the other room of the housing space.

8. The cage for breeding small animals according to claim 1, wherein the ventilation section is formed of a mesh material attached to an opening provided in the partition board, or a passage hole or a slit provided in the partition board.

9. The cage for breeding small animals according to claim 1, wherein the water supply port placing section is formed by cutting out an upper end edge of the partition board.

10. The cage for breeding small animals according to claim 1, wherein the water supply port placing section is a passage hole provided in the partition board.

11. The cage for breeding small animals according to claim 1, wherein the water supply port of the water supply apparatus is a nozzle, and a guiding member for guiding a tip of the nozzle is attached to the water supply port placing section.

12. The cage for breeding small animals according to claim 11, wherein the guiding member is a cylindrical body, and the tip of the nozzle is insertable into the cylindrical body.

13. The cage for breeding small animals according to claim 1, wherein the casing comprises an outer case and an inner case; the partition board is placed in the inner case; an engaging protrusion for retaining the partition board is provided at a bottom portion of the inner case; an engaging recess section, which can engage with the engaging protrusion, is provided at a bottom portion of the partition board; and a protrusion, which can engage with a recess portion provided on a bottom surface side of the engaging protrusion of the inner case, is provided at a bottom portion of the outer case.

14. The cage for breeding small animals according to claim 1, wherein an end of the water supply apparatus is pivotably connected to the lid using a shaft.

15. An air tightly closed-system cage for breeding small animals, comprising a casing with an opening on an upper surface thereof, a lid for covering the opening of the casing, a housing space for small animals within the casing; and a water supply apparatus, wherein the cage comprises:
an air pipe for sending air into the casing;
an exhaust pipe for discharging the air in the casing;
a partition board for dividing the housing space into a plurality of rooms;
a ventilation section provided in the partition board for communicatively connecting the plurality of rooms;
a shielding section provided in the partition board for shielding the rooms from one another; and
a communicating section, provided at the partition board, for placing a tip of a nozzle provided to the water supply apparatus.

* * * * *